US012130156B1

(12) United States Patent
Lacaze et al.

(10) Patent No.: US 12,130,156 B1
(45) Date of Patent: Oct. 29, 2024

(54) SYSTEMS AND METHODS FOR REMOTE PROOF-OF-WORK

(71) Applicant: Robotic Research OpCo, LLC, Clarksburg, MD (US)

(72) Inventors: Alberto Daniel Lacaze, Potomac, MD (US); Kyle Smith, Montgomery Village, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 263 days.

(21) Appl. No.: 17/948,569

(22) Filed: Sep. 20, 2022

Related U.S. Application Data

(60) Provisional application No. 63/289,617, filed on Dec. 14, 2021, provisional application No. 63/245,965, filed on Sep. 20, 2021.

(51) Int. Cl.
*G01D 1/12* (2006.01)
*G01D 9/02* (2006.01)

(52) U.S. Cl.
CPC ............... *G01D 1/12* (2013.01); *G01D 9/02* (2013.01)

(58) Field of Classification Search
None
See application file for complete search history.

(56) References Cited

U.S. PATENT DOCUMENTS 10,855,077 B2 * 12/2020 Davies .................. G01D 4/004
11,095,444 B2 *  8/2021 Falk ...................... H04L 9/0637
11,500,346 B2 * 11/2022 Valin ...................... F24S 23/77

* cited by examiner

*Primary Examiner* — Peter J Macchiarolo
*Assistant Examiner* — Jermaine L Jenkins
(74) *Attorney, Agent, or Firm* — RowanTree Law Group, PLLC; Carson C.K. Fincham (57) ABSTRACT

Systems and methods for remote Proof-of-Work (PoW) generation.

18 Claims, 5 Drawing Sheets

SYSTEMS AND METHODS FOR REMOTE PROOF-OF-WORK

CROSS-REFERENCE TO RELATED APPLICATIONS

This application claims benefit of and priority under 35 U.S.C. § 119(e) to, and is a Non-provisional of, U.S. Provisional Patent Application No. 63/245,965 filed on Sep. 20, 2021 and titled "SYSTEMS AND METHODS FOR REMOTE PROOF-OF-WORK", and U.S. Provisional Patent Application No. 63/289,617 filed on Dec. 14, 2021 and titled "SYSTEMS AND METHODS FOR REMOTE PROOF-OF-WORK", each of which are hereby incorporated by reference herein in their entireties.

SUMMARY

Embodiments of the disclosure provide systems and/or methods for remote Proof-of-Work (PoW).

BACKGROUND

Proof-of-Work (PoW) is generally used to describe various forms of cryptographic proof protocols that are operable to validate that a certain amount of computational work/effort has been expended. PoW can be utilized for various purposes such as for providing the basis of value for crypto-mining efforts that underpin the basis of cryptocurrency. PoW in computer systems associated with crypto-mining activities has, as it has increased in popularity however, led to a significant increase in consumption of electric power. This increased power consumption taxes electrical grids and increases environmental concerns (particularly in areas where electric power is produced utilizing fossil fuels).

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments described herein are provided at least in part to alleviate various deficiencies of current PoW systems and methods. While current PoW systems provide a mechanism for establishing and/or defining cryptocurrency values, for example, they do so at great electrical expense and environmental degradation. Embodiments herein attempt to alleviate these and other deficiencies of previous and current systems and practice by providing systems and methods that offer remote, self-powered, and/or off-grid PoW.

In some embodiments, remote and/or off-grid PoW systems may also or alternatively provide general environmental benefits such as by utilizing waste fluids (e.g., methane off-gas such as "flare gas") to capture otherwise lost energy and/or to reduce the amount of waste fluid introduced into the environment. Various municipal and/or industrial processes, for example, produce waste fluids that are released (e.g., vented) into the environment. Often, these waste fluids contain energy that could be utilized to produce electricity (for example), but the use of the waste fluids for energy generation is disregarded as an option for various reasons. The value of the electricity generated (e.g., the amount of potential revenue from selling the energy) is often heavily outweighed by the necessary costs of capture, generation, and distribution (e.g., transmission) infrastructure that would be required to provide consumable energy for sale. In the case that the waste fluid is itself volatile (e.g., methane gas), required costs are increased dramatically due to necessary safety compliance infrastructure and procedures. Such issues are compounded, particularly with respect to distribution infrastructure costs, in the case that the facility producing the waste fluid is distant from electrical power consumers. This is often the case with respect to large, stand-alone industrial facilities such as refineries and mines.

Municipal sources such as landfills generally produce waste fluid as off-gas comprised of methane, carbon dioxide, and/other compounds. Such sources are not often proximate to power and/or gas consumers and due to the sensitive nature of landfill components, installation of power generation and distribution infrastructure is not likely to be feasible (one can not simply erect a power distribution pole into the layers of a landfill, for example).

Systems and methods described herein provide for low-cost remote power generation utilizing the waste fluid of a particular facility and/or location. The waste fluid of the particular location and the power generated, instead of being collected and distributed for consumption by remote consumers that may be distant from the location is instead utilized on-site to produce value. According to some embodiments, the remote/off-grid power generation is utilized to power PoW systems that only require wireless connectivity with remote systems to realize the PoW value. In some embodiments, due to the often variable supply and/or quality of waste fluids, the PoW systems may dynamically adjust their PoW processing to match and/or track electrical energy production. In such a manner, for example, even small amounts of waste fluid may be utilized to create value by powering PoW processing that can then be verified and/or effectuated via remote (e.g., wireless) communications.

In such a manner, for example, embodiments described herein may reduce gas flaring, off-gassing, and/or other environmentally unfriendly waste fluid venting and/or releasing into the atmosphere while simultaneously generating value (other than the value of generated electricity) that can be transmitted from remote locations (e.g., PoW).

II. Remote PoW Systems

Figure 1:
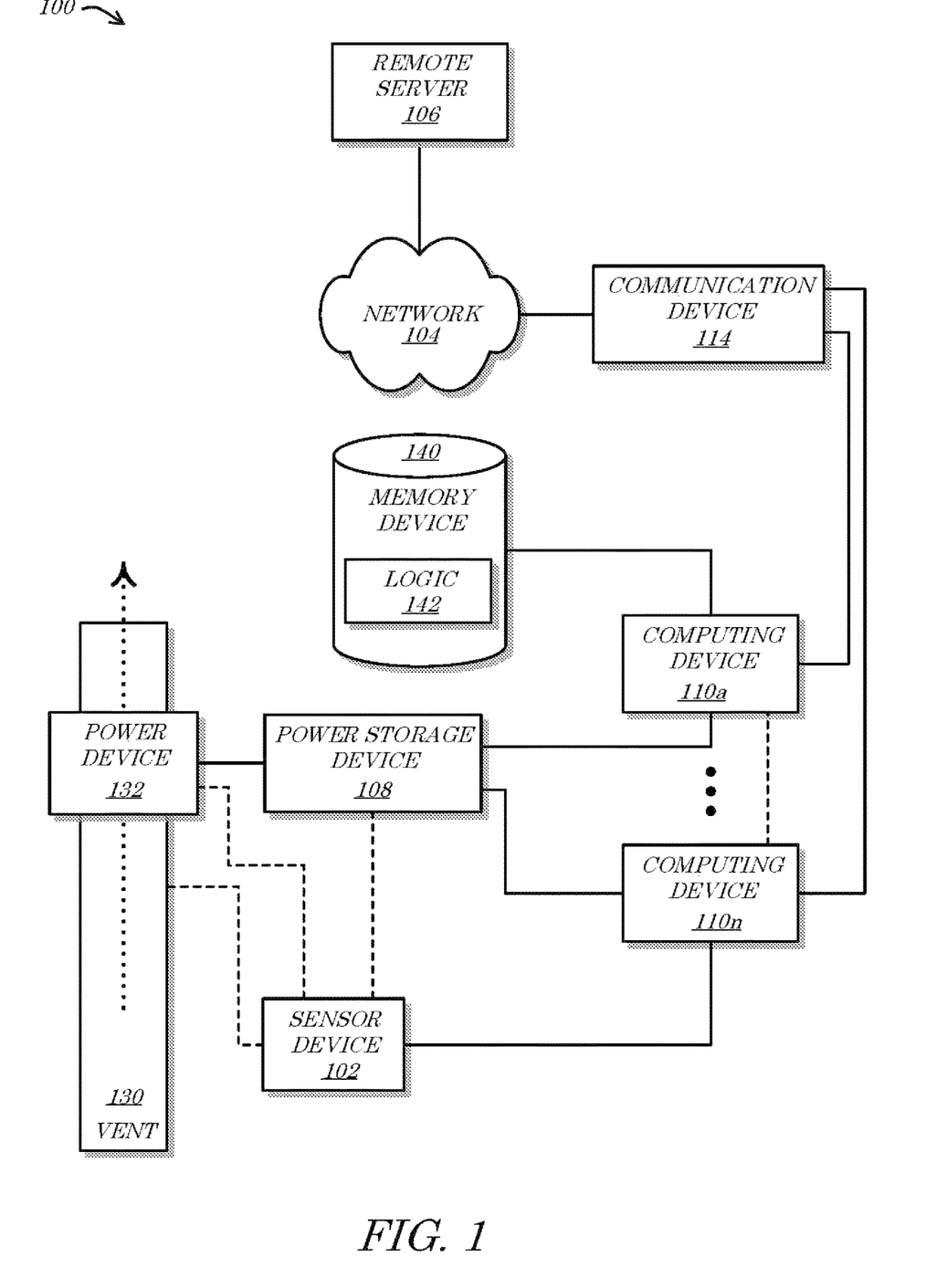
FIG. 1 is a block diagram of a system according to some embodiments.

Referring to FIG. 1, a block diagram of a system 100 according to some embodiments is shown. In some embodiments, the system 100 may comprise a sensor device 102 and a network 104 (e.g., one or more communications objects such as a wireless transceiver, computer bus, wires, cables, etc.). According to some embodiments, a remote server 106 may be in communication with the network 104. In some embodiments, a power storage device 108 (e.g., a battery) may be in communication with and/or coupled to a plurality of computing devices 110*a-n*—e.g., to provide power thereto for conducting computing operations such as PoW processing, as described herein. According to some embodiments, the computing devices 110a-n may be in direct or indirect communication with and/or coupled to a communication device 114 via which the computing devices 110a-n communicate with and/or via the network 104.

In some embodiments, the sensor device 102 may comprise an imaging, pressure sensing, motion sensing, temperature sensing, and/or other input device that is disposed to capture, record, and/or monitor data descriptive of a waste fluid flow, e.g., through a conduit or vent 130. According to some embodiments, a power device 132 may be coupled with the vent 130 to generate electrical power from the waste fluid and provide the generated power to the power storage device 108 (e.g., thereby powering the computing devices 110a-n). According to some embodiments, the sensor device 102 may be in communication with one or more of the computing devices 110a-n and/or may provide indications of the data to the computing devices 110a-n. According to some embodiments, the computing devices 110a-n may be in communication with a memory device 140 (e.g., storing logic 142). In accordance with various embodiments herein, the sensor device 102 may be utilized to obtain data descriptive of the vent 130 (and/or waste fluid therein and/or traveling therethrough; not separately shown), such as to detect a volume, speed, temperature, and/or pressure of waste fluid flow. In some embodiments, the captured data may be provided from the sensor device 102 to the computing devices 110a-n, the power device 132, and/or the power storage device 108. In some embodiments, the sensor device 102 may also or alternatively be coupled to sense data descriptive of the power device 132 and/or the power storage device 108 such as current power generation rates, operating characteristics such as temperature and/or RPM, power storage levels, power load or drawn levels, etc.

In some embodiments, the computing devices 110a-n may execute logic (e.g., the logic 142) to generate, conduct, and/or provide PoW. According to some embodiments, the processing speed, power, complexity, and/or other parameters of the computing devices 110a-n may be dynamically and automatically adjusted based on the data from the sensor device 102. In such a manner, for example, data descriptive of the waste fluid and/or the power generation and/or storage derived therefrom may be utilized to adjust PoW processing to fit within operational power constraints of the remote/off-grid system 100.

Fewer or more components 102, 104, 106, 108, 110a-n, 114, 130, 132, 140, 142 and/or various configurations of the depicted components 102, 104, 106, 108, 110a-n, 114, 130, 132, 140, 142 may be included in the system 100 without deviating from the scope of embodiments described herein. In some embodiments, the components 102, 104, 106,108, 110a-n, 114, 130, 132, 140, 142 may be similar in configuration and/or functionality to similarly named and/or numbered components as described herein. In some embodiments, the system 100 (and/or portions thereof) may comprise a remote PoW program, system, and/or platform programmed and/or otherwise configured to execute, conduct, and/or facilitate various methods such as the method 400 of FIG. 4 herein, and/or portions thereof.

The sensor device 102, in some embodiments, may comprise any type or configuration of device, sensor, and/or object that is capable of capturing imagery, motion, pressure, light, strain, temperature, and/or other data descriptive of the vent 130 and/or waste fluid thereof. The sensor device 102 may comprise, for example, a pressure sensor, a fluid flow sensor, and/or a camera and/or a ranging device such as a Light Detection and Ranging (LiDAR) device. In some embodiments, the sensor device 102 may comprise a multispectral imaging device capable of capturing three or four band imagery data (e.g., RGB plus Near IR). The imagery and/or other data captured by the sensor device 102 may generally comprise any type, quantity, and/or format of digital, analog, photographic, video, pressure, light, strain, temperature, flow, and/or other sensor data descriptive of the vent 130 and/or waste fluid thereof. In some embodiments, the sensor device 102 may comprise a user device incorporating sensor capabilities such as any type or configuration of computing, mobile electronic, network, user, and/or communication device that is or becomes known or practicable. The sensor device 102 may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. In some embodiments, the sensor device 102 may comprise one or more devices owned and/or operated by one or more users and/or entities.

According to some embodiments, the sensor device 102 may communicate with the computing devices 110a-n, the power device 132, and/or the power storage device 108 to provide data captured by the sensor device 102 for analysis and/or assessment and/or causing automatic triggering events. According to some embodiments, the sensor device 102 may store and/or execute specially programmed instructions (such as a mobile device application) to operate in accordance with embodiments described herein. The sensor device 102 may, for example, execute one or more mobile device programs that activate and/or control the sensor device 102 and/or that send commands to one or more of the computing devices 110a-n, the power device 132, and/or the power storage device 108 in response to detected data from the vent 130.

The network 104 may, according to some embodiments, comprise a Local Area Network (LAN; wireless and/or wired), cellular telephone, Bluetooth® and/or Bluetooth® Low Energy (BLE), Near Field Communication (NFC), and/or Radio Frequency (RF) network with communication links between the computing devices 110a-n (and/or the communication device 114) and the remote server 106. In some embodiments, the network 104 may comprise direct communications links between any or all of the components 102, 108, 110a-n, 114, 132, 140 of the system 100. The sensor device 102 may, for example, be directly interfaced or connected to the computing devices 110a-n via one or more wires, cables, wireless links, and/or other network components, such network components (e.g., communication links) comprising portions of the network 104. In some embodiments, the network 104 may comprise one or many other links or network components other than those depicted in FIG. 1. The remote server 106 may, for example, be connected to the computing devices 110a-n and/or the communication device 114 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 108, 110*a-n*, 114, 132, 140 of the system 100. The network 104 may comprise one or more cellular telephone networks with communication links between the remote server 106 and the communications device 114, for example, and/or may comprise a BLE, NFC, RF, and/or "personal" network comprising short-range wireless communications between the sensor device 102 and the computing devices 110*a-n*, for example.

In some embodiments, the remote server 106 may comprise one or more electronic and/or computerized processing devices, such as a computer server and/or server cluster communicatively coupled to interface with the communication device 114 (directly and/or indirectly; e.g., via the network 104). The remote server 106 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the remote server 106 may be located remotely from the communication device 114 and/or the vent 130. The remote server 106 may be located in a server farm connected to an electrical grid (not shown), for example, while the communication device 114 may be located at the remote and/or off-grid site where waste fluid is directed through the vent 130. The remote server 106 may also or alternatively comprise a plurality of electronic processing devices located at one or more various remote sites and/or locations (e.g., a distributed computing and/or processing network).

According to some embodiments, the remote server 106 may store and/or execute specially-programmed instructions to operate in accordance with embodiments described herein. The remote server 106 may, for example, execute one or more programs that identify, verify, authenticate, and/or value PoW conducted by the computing devices 110*a-n* (e.g., a cryptocurrency or "mining" server). According to some embodiments, the remote server 106 may comprise a computerized processing device, such as a PC, laptop computer, computer server, and/or other network or electronic device, operated to conduct cryptocurrency operations at one or more centralized and/or grid-connected locations.

In some embodiments, the power storage device 108 may comprise any type, quantity, and/or configuration of devices and/or objects that are operable to store energy and/or power (and/or waste fluid). The power storage device 108 may comprise, for example, one or more batteries, capacitors, and/or pneumatic or hydraulic energy storage mechanisms. According to some embodiments, the power storage device 108 may comprise one or more 4.352 kWh, 170 Ah, 24-V Hawk™ standby batteries available from BigBattery.com of Chatsworth, CA. According to some embodiments, the power storage device 108 may comprise a bladder, reservoir, tank, and/or vessel coupled (e.g., via appropriate fluid plumbing) to capture and/or store waste fluid from the vent 130. In some embodiments, the waste fluid may be selectively and/or automatically routed to either the power storage device 108 (e.g., for storage) or to the power device 132 (e.g., for current power production/generation).

In some embodiments, the computing devices 110*a-n* may comprise one or more electronic and/or computerized processing devices, such as a computer server and/or server cluster communicatively coupled to interface with the sensor device 102 (directly and/or indirectly). The computing devices 110*a-n* may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the computing devices 110*a-n* may be located remotely from the remote server 106. The computing devices 110*a-n* may be located proximate to the vent 130, for example, while the remote server 106 may be many miles away and only reachable via the communication device 114 via a long-range wireless network 104 (e.g., a cellular and/or satellite transmission network). The computing devices 110*a-n* may also or alternatively comprise a plurality of electronic processing devices located at one or more various sites and/or locations (e.g., a distributed computing and/or processing network) comprising the vent 130.

According to some embodiments, the computing devices 110*a-n* may store and/or execute specially-programmed instructions to operate in accordance with embodiments described herein. The computing devices 110*a-n* may, for example, execute one or more programs that generate and/or define PoW and/or that automatically set and/or adjust processing speed, communications bandwidth and/or activity, and/or other parameters in response to sensor data from the sensor device 102 descriptive of the vent 130 (and/or fluid therein). According to some embodiments, the computing devices 110*a-n* may comprise a computerized processing device, such as a PC, laptop computer, computer server, and/or other network or electronic device, operated to conduct cryptocurrency mining operations in a remote and/or off-grid location (e.g., the location of the vent 130).

In some embodiments, the communication device 114 may comprise any type, quantity, and/or configuration of communication and/or network devices such as one or more wireless and/or wired transceiver devices. The communication device 114 may comprise, for example, an Agilis™— AAV110 Series SATCOM transceiver available from Agilis™ Satcom of Ojai, CA and/or an airMAX™ GigaBeam Long-Range 60/5 GHz Radio with a 2-km range available from Ubiquiti™ Inc. of New York, NY.

In some embodiments, the power device 132 may comprise any type, quantity, and/or configuration of device that is operable to generate electrical power from the waste fluid (whether from the vent 130 and/or stored in the power storage device 108), that is or becomes known or practicable. The power device 132 may comprise a turbine, internal combustion engine, boiler, bladder, pressure tank, etc. In some embodiments, the power device 132 may generate power from the heat produced by combusted flare gas/waste fluid at an end of the vent 130 and/or may utilize the flare gas (methane, and/or other gases and/or combustible liquids) to generate steam (e.g., a steam turbine) and/or to power a drive shaft (e.g., an internal combustion engine). According to some embodiments, the power device 132 may comprise one or more nozzles, constrictions, compressors, decompressors, fans, blades, bearings, coils, and/or other devices that facilitate the generation of electrical power from the vent 130. In some embodiments, the power device 132 may comprise a device that is mounted and/or coupled to the vent 130.

In some embodiments, the memory device 140 may store various data such as fluid data, vent data, location data (such as coordinates, distances, etc.), security access protocol and/or verification data, power generation and/or usage data, and/or assessment data and/or logic (such as fluid flow-based processing level rules), and/or instructions that cause various devices (e.g., the computing devices 110*a-n*, the sensor device 102, the power device 132, and/or the power storage device 108) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store data descriptive of the vent 130, waste fluid flow, waste fluid identification and/or composition data, user identifier data, image (and/or other sensor data) analysis data, image (and/or other sensor data) processing data, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC), and any various practicable form-factors, such as original, mini, and micro sizes, such as those available from Western Digital Corporation of San Jose, CA). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the sensor device 102, the computing devices 110*a-n*, the communication device 114, the power storage device 108, the power device 132, and/or the remote server 106 may comprise the memory device 140 or a portion thereof, for example.

According to some embodiments, the computing devices 110*a-n* may store and/or execute specially-programmed instructions that cause the waste fluid/flare gas to be automatically and/or selectively utilized to generate power or to be stored for later use. The computing devices 110*a-n* may comprise a known maximum operational power consumption rate or level, for example, and an amount of waste fluid computed to be necessary to produce enough current power to satisfy the maximum may be automatically routed to the power device 132 and utilized for power generation. In some embodiments, in the case that an amount of waste fluid exceeds the amount required to produce the maximum power consumption level/rate, the excess amount may be automatically and/or selectively (i) diverted away from the power device 132 (e.g., to continue through the vent 130), (ii) routed to a waste disposal device (not separately depicted) such as a flare gas burner, catalytic converter, filter, etc., and/or (iii) routed from the power device 132 to the power storage device 108 and/or a separate (not separately depicted) waste fluid storage unit or device. According to some embodiments, in the case that the amount of waste fluid is currently less than the amount required to produce the maximum power consumption level/rate, waste fluid stored in the power storage device 108 and/or the separate waste fluid storage unit may be routed to the power device 132 to increase the amount of power generation (e.g., to the maximum power consumption level/rate) and/or power stored in the power storage device 108 may be routed to the computing devices 110*a-n*.

Figure 2:
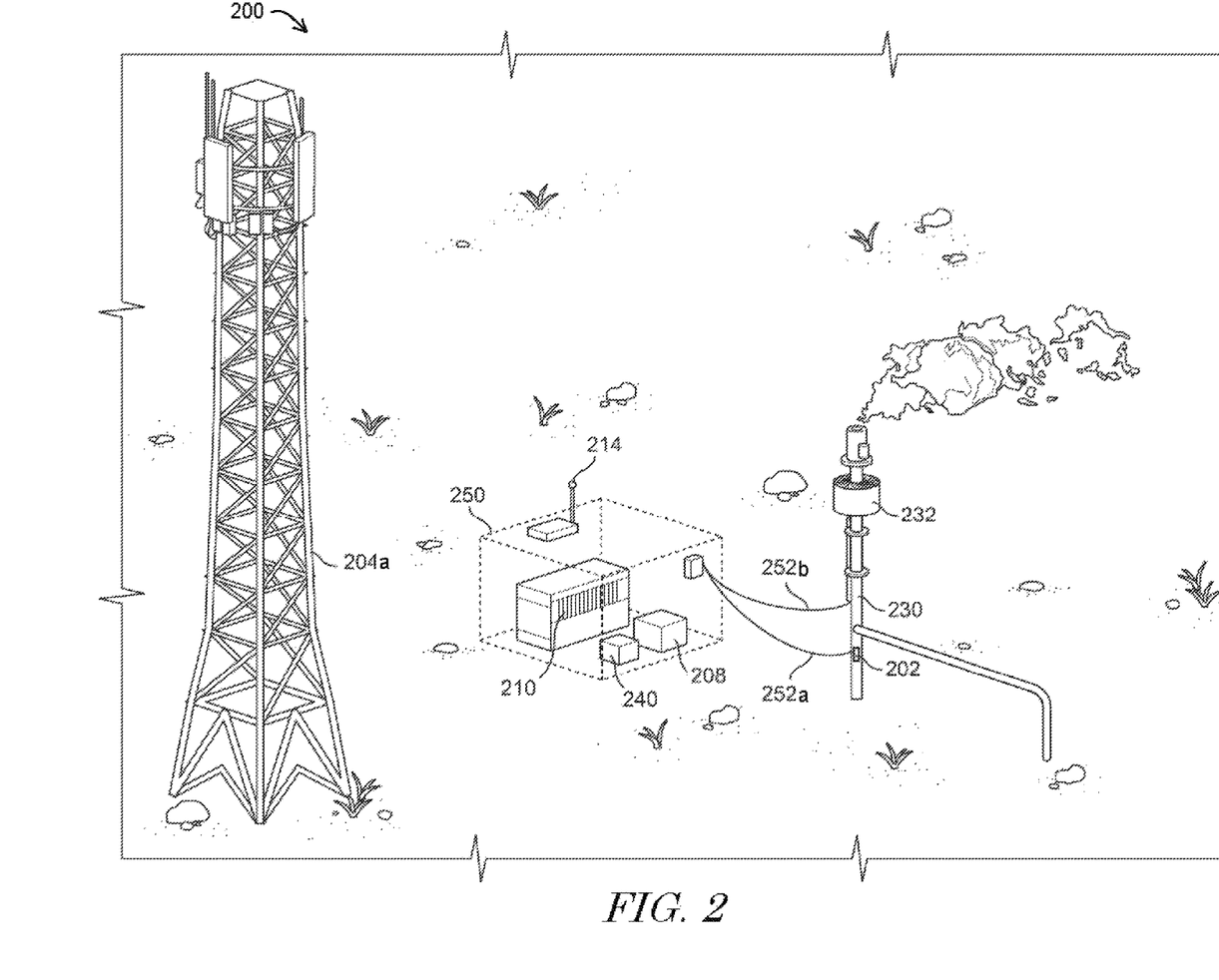
FIG. 2 is a view of a system according to some embodiments.

Turning to FIG. 2, a diagram of a system 200 according to some embodiments is shown. In some embodiments, the system 200, for example, may comprise a remote Proof-of-Work (PoW) system similar to the system 100 of FIG. 1 herein. In some embodiments, a system 200 may comprise a sensor 202 coupled to a waste fluid conduit or vent 230 (e.g., a natural gas vent pipe) and a generator 232 coupled to the conduit 230 and in electrical communication with an electrical box 250 that provides protection and structure for a number of power and processing elements (detailed below). In some embodiments, a battery 208 may be disposed within the electrical box 250 and in communication with and/or coupled to a plurality of computing devices 210 to provide power thereto for conducting computing operations such as crypto-mining and PoW processing, in accordance with embodiments described herein. According to some embodiments, the computing devices 210 may be in communication with and/or coupled to a communication device 214 via which the computing devices 210 communicate with a network (e.g., cellular network by wirelessly communicating with a nearby cellular tower 204*a*).

Crypto-mining and PoW processing may generally comprise any number and/or type of computational procedures that are or become known or practicable such as may be conducted in accordance with one or more crypto-currency, blockchain, and/or PoW models, processes, and/or protocols. The PoW model, for example, is a consensus mechanism used to confirm and record cryptocurrency transactions stored electronically on a blockchain, which is a distributed and/or decentralized public ledger made up of blocks of transactions. PoW is proof that a machine has expended computational power to solve an arbitrary puzzle (e.g., a complex mathematical problem) to confirm transactions on the blockchain without the use of a third party (e.g., a financial, governmental, and/or other verifying institution). The confirmation is accomplished by communicating the solution to a remote server and/or computing device (e.g., the distributed and/or decentralized blockchain). With proof-of-work cryptocurrencies, each block of transactions has a specific hash that is computed from the data within the block. For the block to be confirmed, a crypto miner must solve the arbitrary puzzle and generate a target hash for that particular block. The first "miner" that solves for the target hash and updates the blockchain receives crypto rewards (e.g., some value of cryptocurrency). Generally, solving the puzzle to generate the target hash is difficult enough and requires enough computational power and/or energy that it prevents the simple manipulation of transaction records on the blockchain. Proof-of-stake is similar to but is an alternative to PoW. Proof of stake chooses transaction validators based on how many cryptocoins the validator has staked to the network and can process transactions more quickly with less energy usage, making proof-of-stake cryptocurrencies more environmentally friendly. In some embodiments, proof-of-stake may be used in place of PoW.

In some embodiments, the sensor 202 may comprise an imaging, pressure sensing, motion sensing, temperature sensing, and/or other input device that is disposed to capture, record, and/or monitor data descriptive of a waste fluid flow, e.g., through the conduit 230. According to some embodiments, the generator 232 may be coupled to the conduit 230 to generate electrical power from the waste fluid and provide the generated power to the electrical box 250 and/or directly to the battery 208 and/or the computing devices 210 through an electrical line 252*b* (e.g., thereby powering the computing devices 210). According to some embodiments, the sensor 202 may be in communication either wirelessly or through an electrical conduit 252*a* with the electrical box and/or directly to one or more of the computing devices 210 and/or may provide indications of the data to the computing devices 210. According to some embodiments, the computing devices 210 may be in communication with a memory device 240 (e.g., storing logic). In accordance with various embodiments herein, the sensor 202 may be utilized to obtain data descriptive of the conduit 230 (and/or waste fluid therein and/or traveling therethrough; not separately shown), such as to detect a volume, speed, temperature, and/or pressure of waste fluid flow. In some embodiments, the captured data may be provided from the sensor 202 to the computing devices 210, the generator 232, and/or the battery 208. In some embodiments, the sensor 202 may also or alternatively be coupled to sense data descriptive of the generator 232 and/or the battery 208 such as current power generation rates, operating characteristics such as temperature and/or RPM, power storage levels, power load or drawn levels, etc.

In some embodiments, the computing devices 210 may execute logic to generate, conduct, and/or provide PoW. According to some embodiments, the processing speed, power, complexity, and/or other parameters of the computing devices 210 may be dynamically and automatically adjusted based on the data from the sensor 202. In such a manner, for example, data descriptive of the waste fluid and/or the power generation and/or storage derived therefrom may be utilized to adjust PoW processing to fit within operational power constraints of the remote/off-grid system 200.

According to some embodiments, the computing devices 210 may store and/or execute specially-programmed instructions that cause the waste fluid/flare gas to be automatically and/or selectively utilized to generate power or to be stored for later use. The computing devices 210 may comprise a known maximum operational power consumption rate or level, for example, and an amount of waste fluid computed to be necessary to produce enough current power to satisfy the maximum may be automatically routed to the generator 232 and utilized for power generation. In some embodiments, in the case that an amount of waste fluid exceeds the amount required to produce the maximum power consumption level/rate, the excess amount may be automatically and/or selectively (i) diverted away from the generator 232 (e.g., to continue through the conduit 230), (ii) routed to a waste disposal device (not separately depicted) such as a flare gas burner, catalytic converter, filter, etc., and/or (iii) routed from the generator 232 to the battery 208 and/or a separate (not separately depicted) waste fluid storage unit or device. According to some embodiments, in the case that the amount of waste fluid is currently less than the amount required to produce the maximum power consumption level/rate, waste fluid stored in the battery 208 and/or the separate waste fluid storage unit may be routed to the generator 232 to increase the amount of power generation (e.g., to the maximum power consumption level/rate) and/or power stored in the battery 208 may be routed to the computing devices 210.

Fewer or more components 202, 204a, 208, 210, 214, 230, 232, 240, 250, 252a, 252b, and/or various configurations of the depicted components 202, 204a, 208, 210, 214, 230, 232, 240, 250, 252a, 252b may be included in the system 200 without deviating from the scope of embodiments described herein. In some embodiments, the components 202, 204a, 208, 210, 214, 230, 232, 240, 250, 252a, 252b may be similar in configuration and/or functionality to similarly named and/or numbered components as described herein. In some embodiments, the system 200 (and/or portions thereof) may comprise a remote PoW program, system, and/or platform programmed and/or otherwise configured to execute, conduct, and/or facilitate various methods such as the method 400 of FIG. 4 herein, and/or portions thereof.

Figure 3:
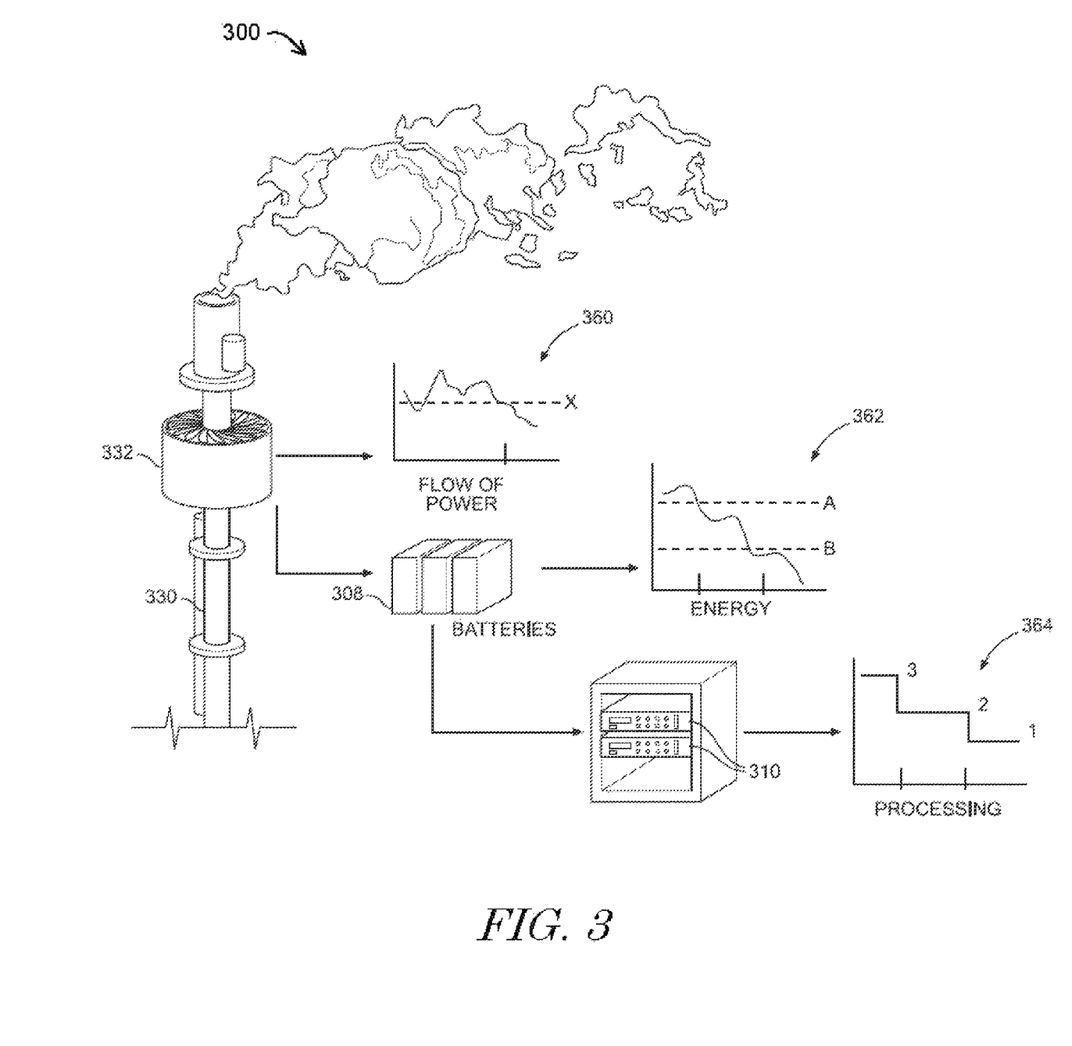
FIG. 3 is a diagram of a method according to some embodiments.

Turning to FIG. 3, a diagram of a system 300 according to some embodiments is shown. In some embodiments, the system 300 may comprise a remote Proof-of-Work (PoW) system similar to the system 100 and/or 200 of FIG. 1 and/or FIG. 2 herein. In some embodiments, for example, a system 300 may comprise a power source or generator 332 coupled to a waste fluid conduit or vent 330 (e.g., a natural gas vent pipe) and in electrical communication with a battery 308 (e.g., a power storage device such as a bank of batteries). The battery 308 may be in communication with and/or coupled to one or a plurality of computing devices 310 to provide power thereto for conducting computing operations such as PoW processing, as described herein.

According to some embodiments, the generator 332 (e.g., a turbine as depicted in FIG. 3) may be coupled to the conduit 330 to generate electrical power from the waste fluid flow and provide the generated power directly or indirectly to the battery 308 (e.g., thereby powering the computing devices 310). According to some embodiments, a sensor (not separately depicted in FIG. 3) may be in communication (e.g., directly or indirectly) either wirelessly or through an electrical conduit to one or more of the computing devices 310 and/or may provide indications of data relating to the power device 332 to the computing devices 310. According to some embodiments, the computing devices 310 may be in communication with a memory device (e.g., storing logic, not separately shown in FIG. 3). In accordance with various embodiments herein, the sensor may be utilized to obtain data descriptive of the conduit 330 (and/or waste fluid therein and/or traveling therethrough; not separately shown), such as to detect a volume, speed, temperature, and/or pressure of waste fluid flow. In some embodiments, the captured data may be provided from the sensor to the computing devices 310, the generator 332, and/or the battery 308. In some embodiments, the sensor may also or alternatively be coupled to sense data descriptive of the generator 332 and/or the battery 308 such as current power generation rates, operating characteristics such as temperature and/or RPM, power storage levels, power load or drawn levels, etc.

In some embodiments, the computing devices 310 may execute logic to generate, conduct, and/or provide PoW. According to some embodiments, the processing speed, power, complexity, and/or other parameters of the computing devices 310 may be dynamically and automatically adjusted based on the data from the sensor. In such a manner, for example, data descriptive of the waste fluid and/or the power generation and/or storage derived therefrom may be utilized to adjust PoW processing to fit within operational power constraints of the remote/off-grid system 300.

In some embodiments, the instantaneous power generated by the generator 332 (and/or waste fluid provided by the conduit 330) fluctuates with time as shown in a power (and/or flow/energy)/time graph 360. The power/flow fluctuations may be based on a number of factors such as but not limited to waste fluid flow, viscosity, fluid composition (e.g., energy density), volume, humidity, temperature, and/or generator efficiency. In some embodiments, when the instantaneous power/flow generated (and/or flow) is above a current energy threshold such as the minimum or maximum power requirement to run the system (e.g., depicted as line "x" in the graph 360), then the excess power (that which is above line "x") may be routed to the battery 308 to increase the stored and/or available power of the system 300. In some embodiments, if the instantaneous power/flow generated is below the threshold (such as the minimum or maximum power requirement) "x" then the system 300 may begin drawing power from the battery 308 to power the computing devices 310 and/or dynamically adjust the PoW processing of the computing devices 310 to match and/or track the instantaneous electrical energy/fluid flow production (e.g., by reducing the computation complexity, reducing processing power of the individual computing devices 310, and/or shutting down one or more computing devices 310 as shown in the processing power/time graph 364).

In some embodiments, the amount of power stored within the battery 308 may fluctuate with time as shown in the power stored/time graph 362. The stored power may fluctuate based on changes in the system inputs (e.g., fluid flow and/or power produced by the generator 332) and/or the system outputs (e.g., PoW and/or other processing results). In some embodiments, when the stored power is above a first predetermined energy threshold such as a maximum (e.g., depicted as line "A" in the graph 362), then the battery may not draw power from the generator 332 under normal use (e.g., when the generator 332 is generating power below its maximum power requirement "x". In some embodiments, the stored power within the battery 308 may be utilized by the system 300 and depleted, and may drop below the predetermined maximum "A". When the stored power drops below the predetermined maximum "A", then the battery 308 may draw power from the generator 332 to "refill" the battery to its predetermined maximum "A". In some embodiments, the stored power within the battery 308 may be utilized by the system 300 and depleted, and may drop below a second predetermined energy threshold such as a minimum and/or intermediate (e.g., depicted as "B" in the graph 362). In some embodiments, when the stored power in the battery 308 drops below the predetermined minimum "B", the stored power within the battery 308 may be rendered unavailable to the system 300 for use by the computing devices 310.

According to some embodiments, the system 300 may dynamically and/or automatically adjust a level of processing, power consumption, etc. of the computing devices 310 based on one or more of the current flow/power (e.g., the graph 360) and the stored power (e.g., the graph 362). In a case where the current power/flow is determined to be above the current energy threshold "x" and the stored energy in the batteries 308 is determined to be above the first energy threshold "A", for example, a first processing power state of three (3) as depicted (e.g., at a first time) on the graph 364 may be activated and/or established. While the number three (3) is provided solely for purposes of non-limiting example, in some embodiments it may represent all three (3) processors of a triple processor computing device 310 or all three (3) computing devices 310 of three (3) computing devices 310 being powered-on, activated, and/or actively processing (e.g., PoW processing). In some embodiments, a second processing power state of two (2) as depicted (e.g., at a second time) on the graph 364 may be activated and/or established, e.g., in response to one or more of the current power/flow being determined to be below the current energy threshold "x" and/or the stored energy in the batteries 308 being determined to be below the first energy threshold "A" (and/or the second energy threshold "B"). According to some embodiments, a third processing power state of one (1) as depicted (e.g., at a third time) on the graph 364 may be activated and/or established, e.g., in response to one or more of the current power/flow being determined to be below the current energy threshold "x" and/or the stored energy in the batteries 308 being determined to be below the second energy threshold "B". Additional or fewer thresholds may be utilized to dynamically alter the processing power and/or settings of the computing device 310, e.g., in response to changes in the waste fluid flow, energy produced therefrom, and/or stored energy reserves.

Fewer or more components 308, 310, 330, 332, and/or various configurations of the depicted components 308, 310, 330, 332 may be included in the system 300 without deviating from the scope of embodiments described herein. In some embodiments, the components 308, 310, 330, 332 may be similar in configuration and/or functionality to similarly named and/or numbered components as described herein. In some embodiments, the system 300 (and/or portions thereof) may comprise a remote PoW program, system, and/or platform programmed and/or otherwise configured to execute, conduct, and/or facilitate various methods such as the method 400 of FIG. 4 herein, and/or portions thereof.

III. Methods of Using Remote PoW Systems

Figure 4:
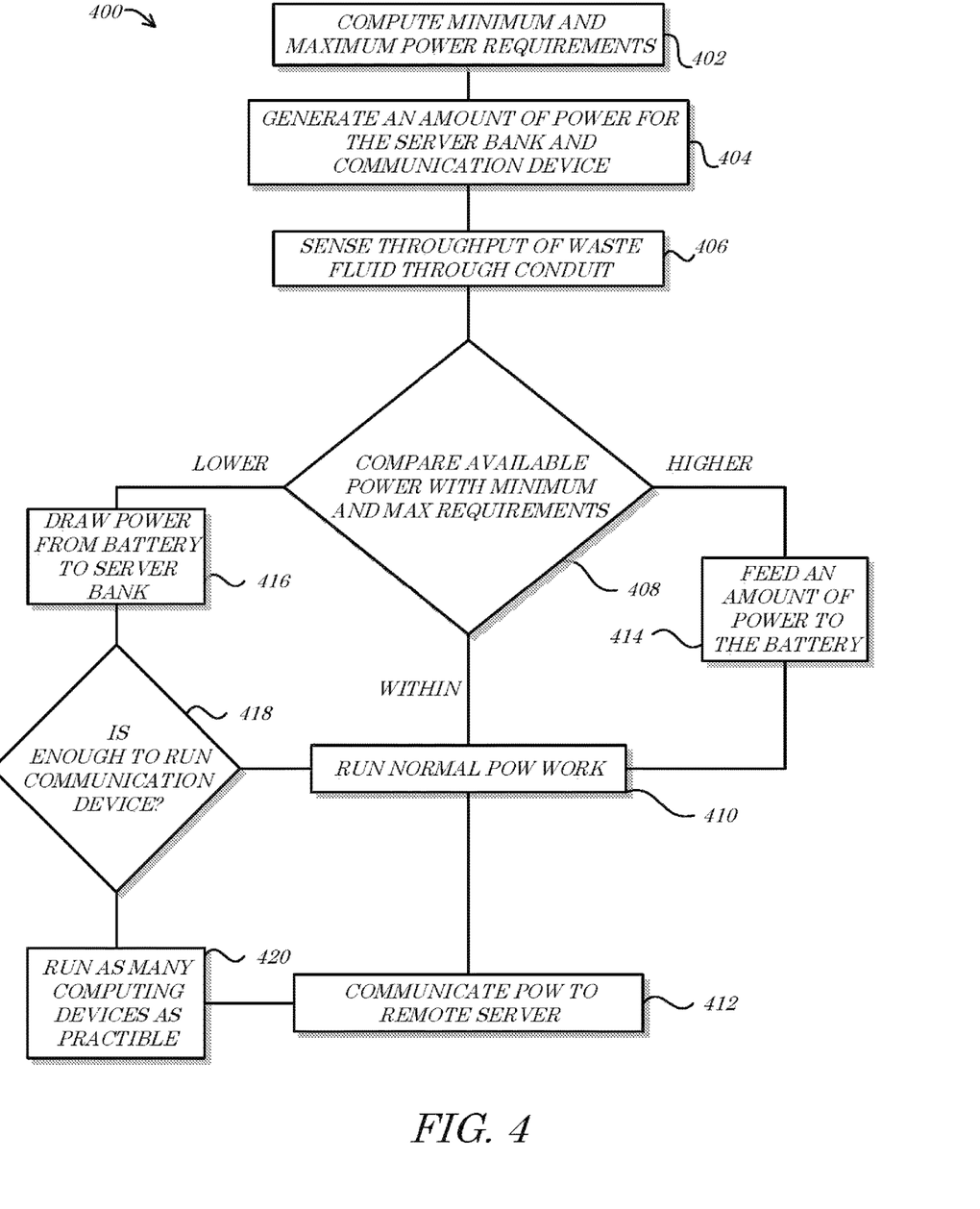
FIG. 4 is a block diagram of a system according to some embodiments.

Turning to FIG. 4, a flow diagram of a method 400 according to some embodiments is shown. In some embodiments, the system of the method 400 described below may comprise a remote PoW system similar to the systems 100, 200 and/or 300 of FIG. 1, FIG. 2, and/or FIG. 3 herein.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); (e.g., the memory/data devices 140 and/or 240 of FIG. 1 and/or FIG. 2 herein) may store thereon instructions that when executed by a machine (such as a computerized processor) result in performance according to any one or more of the embodiments described herein.

In some embodiments, the method 400 may comprise computing (e.g., calculating) maximum and/or minimum power requirements for the system (e.g., computing device or computing devices and/or communication device) to conduct crypto-mining activities (and/or other desired processing) and generate and/or communicate PoW data to a remote server, at 402. In some embodiments, the maximum power requirement may be defined by the maximum power that all present elements need to run simultaneously (e.g., the computing devices, the battery, the memory device, the communication device, and/or any other electrical devices within or attached to system). According to some embodiments in which multiple processing and/or crypto-mining devices or instances are utilized and/or available, the maximum power requirement may compromise a summation of all power requirements for each of the multiple processing and/or crypto-mining devices or instances. In some embodiments, the minimum power requirement may be defined by the minimum power that the system needs to at least conduct crypto-mining activities and/or generate and store PoW output (e.g., one computing device and/or the memory device to temporarily store PoW). According to some embodiments in which multiple processing and/or crypto-mining devices or instances are utilized and/or available, the minimum power requirement may compromise a minimum power requirement for any single device and/or instances of the multiple processing and/or crypto-mining devices or instances. In some embodiments, one or more intermediate power requirement levels between the maximum and the minimum may also or alternatively be computed. According to some embodiments, any power level may be determined by reference to one or more lookup tables, performing one or more predefined power computations, and/or by measuring power usage metrics (e.g., of the one or more devices/instances).

In some embodiments, the method 400 may comprise generating an amount of electrical power, at 404. The electrical power may be generated, for example, by attaching a power device and/or a generator to a waste fluid vent and/or conduit and utilizing the energy from the waste fluid flow (e.g., the kinetic energy of the flow of the waste fluid and/or the heat energy from the burning of the waste fluid) to generate an electrical current. At 406, the amount of generated electricity may be sensed by a sensor either directly (e.g., by attaching directly to the outgoing electrical conduit of the power device) or indirectly (e.g., by measuring the flow, pressure, volume, and/or any other characteristic of the waste flow through the vent or conduit and/or other characteristics of the power device). At 408 the instantaneous amount of generated electrical power is compared to the minimum and maximum (and/or intermediary) power requirements of the system (e.g., computed at 402).

In some embodiments, if the instantaneous amount of power is between the minimum and maximum power requirements (e.g., "normal power generation"), then at 410 one or all of the computing devices are operated normally and the generated PoW is communicated to a remote server at 412 in accordance with embodiments described herein. In some embodiments under normal power generation, the system includes running the computing devices to effectuate crypto-mining activities and communicating proof of the crypto-mining activities at 410 (e.g., PoW) via a network (e.g., one or more communications objects such as a wireless transceiver, computer bus, wires, cables, etc.) to a remote server at 412 to generate value. In some embodiments under normal power generation, an amount of the power generated by the power device may be routed to a battery until the battery is fully charged. In other embodiments, if the instantaneous amount of power generated is greater than the maximum power requirement of the system, then at 414 the system may route some or all of the excess amount of available power to the battery regardless of the charge status of battery and continue normal PoW generating activities at 410 and 412. In still other embodiments, if the instantaneous amount of power generated is less than the minimum power requirement of the system, then at 416 the power may be routed from the generator and/or the battery to run as many computing devices as practicable along with the communication device under the normal process at 410. In some embodiments, if there is not enough power from the generator and/or stored in the battery to run the communication device as well as at least one computing device, then at 418 as many computing devices as is practicable may be run at 420 (e.g., none, one, or more computing devices) and the PoW may be stored on a memory device on at least one of the computing devices for later communication, e.g., at a time when there is enough system power to run the communication device at 412.

According to some embodiments, the method 400 may run as many computing devices as possible at 420 by computing a number of computing devices to run based on (i) the current waste fluid flow, (ii) the current power generation, and/or (iii) the stored power/energy (e.g., in the batteries and/or other energy and/or waste fluid storage devices), as compared to the determined power levels. In some embodiments, the values from (i), (ii), and/or (iii) may be utilized to compute a computing level plan for a period of time. In the case that the battery is at fifty percent (50%) storage capacity and the current power/waste fluid available is below the maximum and/or minimum power level requirements (e.g., an "energy deficit"), for example, the processing level of the system may be reduced such that the current available power and a portion of stored power are utilized to run a fraction/subset of the devices with a predicted runtime of a certain number of hours into the future (e.g., eight (8) hours)—e.g., before the battery will likely be depleted. In some embodiments, known and/or derived fluctuation patterns in the waste fluid flow may be utilized to predict and/or schedule different power levels for the system. A first power level that operates all ten (10) processors in a particular example system may be implemented even in an energy deficit, for example, with an expectation (e.g., based on historic trend data) that waste fluid and/or power generation levels will return to a higher level (e.g., above the maximum power level) within three (3) hours. In the case that a prediction is not met, such at the three (3) hours elapsing and the power level remaining below the maximum/minimum levels, then the system may be changed to a second power level in which, e.g., four (4) of the processors are maintained as active and the others are deactivated (e.g., turned off, but in a sleep mode) until more power is available. In such a manner, for example, the system may be dynamically managed to respond to waste fluid flow/power availability without running out of power and while maintaining the highest level of value generation (e.g., via processing power) that is determined to be possible. In some embodiments, such a constant but variable processing power system may be more desirable than a system that repeatedly starts and stops due to power availability.

IV. Computing Device in Use with the Proof-of-Work Systems

Figure 5:
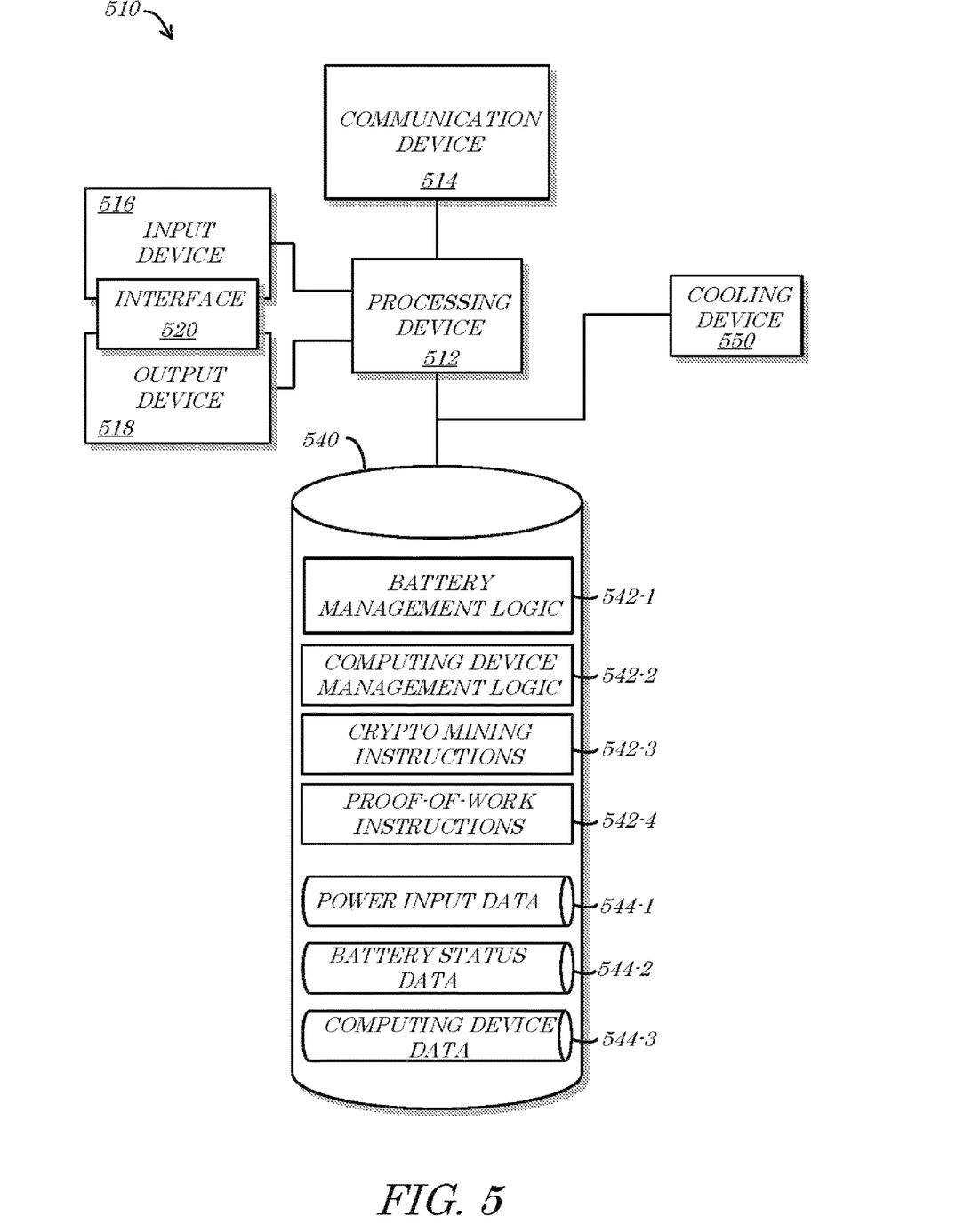
FIG. 5 is a block diagram of a controller according to some embodiments.

Turning to FIG. 5, a block diagram of an computing device 510 according to some embodiments is shown. In some embodiments, the computing device 510 may be similar in configuration and/or functionality to one or more of the PoW systems 100, 200, and/or 300 of FIG. 1, FIG. 2, and/or FIG. 3 herein. In some embodiments, the computing device 510 may, for example, execute, process, facilitate, and/or otherwise be associated with the method 400 of FIG. 4 herein. In some embodiments, the computing device 510 may comprise a processing device 512, a communication device 514, an input device 516, an output device 518, an interface 520, a memory device 540 (storing various programs and/or instructions 542 and data 544), and/or a cooling device 550. According to some embodiments, any or all of the components 512, 514, 516, 518, 520, 540, 542, 544, 550 of the computing device 510 may be similar in configuration and/or functionality to any similarly named and/or numbered components described herein. Fewer or more components 512, 514, 516, 518, 520, 540, 542, 544, 550 and/or various configurations of the components 512, 514, 516, 518, 520, 540, 542, 544, 550 may be included in the computing device 510 without deviating from the scope of embodiments described herein.

According to some embodiments, the processor 512 may be or include any type, quantity, and/or configuration of processor that is or becomes known. The processor 512 may comprise, for example, an Intel® IXP 2800 network processor or an Intel® XEON™ Processor coupled with an Intel® E7501 chipset. In some embodiments, the processor 512 may comprise multiple interconnected processors, microprocessors, and/or micro-engines. According to some embodiments, the processor 512 (and/or the computing device 510 and/or other components thereof) may be supplied power via a power supply (not shown), such as a battery, an Alternating Current (AC) source, a Direct Current (DC) source, an AC/DC adapter, solar cells, and/or an inertial generator. In the case that the computing device 510 comprises a server, such as a blade server, necessary power may be supplied via a standard AC outlet, power strip, surge protector, and/or Uninterruptible Power Supply (UPS) device.

In some embodiments, the communication device 514 may comprise any type or configuration of communication device that is or becomes known or practicable. The communication device 514 may, for example, comprise a Network Interface Card (NIC), a telephonic device, a cellular network device, a router, a hub, a modem, and/or a communications port or cable. In some embodiments, the communication device 514 may be coupled to receive user input data, e.g., from a user device (not shown in FIG. 5). The communication device 514 may, for example, comprise a Bluetooth® Low Energy (BLE) and/or RF receiver device and/or a camera or other imaging device that acquires data from a user (not separately depicted in FIG. 5) and/or a transmitter device that provides the data to a remote server and/or server or communications layer (also not separately shown in FIG. 5). According to some embodiments, the communication device 514 may also or alternatively be coupled to the processor 512. In some embodiments, the communication device 514 may comprise an infrared (IR), RF, Bluetooth™, Near-Field Communication (NFC), and/or Wi-Fi® network device coupled to facilitate communications between the processor 512 and another device (such as a remote user device, not separately shown in FIG. 5).

In some embodiments, the input device 516 and/or the output device 518 are communicatively coupled to the processor 512 (e.g., via wired and/or wireless connections and/or pathways) and they may generally comprise any types or configurations of input and output components and/or devices that are or become known, respectively. The input device 516 may comprise, for example, a keyboard that allows an operator of the computing device 510 to interface with the computing device 510 (e.g., by an operator to update power level settings). In some embodiments, the input device 516 may comprise a sensor, such as an imaging, pressure sensing, motion sensing, temperature sensing, voltage sensing, amperage sensing, electrical power sensing, and/or other input device and report measured values via signals to the computing device 510 and/or the processor 512. The output device 518 may, according to some embodiments, comprise a display screen and/or other practicable output component and/or device. The output device 518 may, for example, provide an interface (such as the interface 520) via which system operating parameters may be output to a user. According to some embodiments, the input device 516 and/or the output device 518 may comprise and/or be embodied in a single device, such as a touch-screen monitor or a personal handheld device.

The memory device 540 may comprise any appropriate information storage device that is or becomes known or available, including but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, store one or more of battery management logic 542-1, computing device management logic 542-2, crypto-mining instructions 542-3, Proof-of-Work (PoW) instructions 542-4, power input data 544-1, battery status data 544-2, and/or computing device data 544-3. In some embodiments, the battery management logic 542-1, computing device management logic 542-2, crypto-mining instructions 542-3, PoW instructions 542-4, power input data 544-1, battery status data 544-2, and/or computing device data 544-3 may be utilized by the processor 512 to analyze input received from the input device 516 and provide system operational data, PoW data, and/or other system information via the output device 518 and/or the communication device 514.

According to some embodiments, the battery management logic 542-1 may be operable to cause the processor 512 to process the power input data 544-1, battery status data 544-2, and/or computing device data 544-3 in accordance with embodiments as described herein. Power input data 544-1, battery status data 544-2, and/or computing device data 544-3 received via the input device 516 and/or the communication device 514 may, for example, be analyzed, sorted, filtered, decoded, decompressed, ranked, scored, plotted, and/or otherwise processed by the processor 512 in accordance with the battery management logic 542-1. In some embodiments, power input data 544-1, battery status data 544-2, and/or computing device data 544-3 may be fed by the processor 512 through one or more mathematical and/or statistical formulas and/or models in accordance with the battery management logic 542-1 to process input data to route power from the generator to the battery and/or draw power from the battery to the computing device, in accordance with embodiments described herein.

In some embodiments, the computing device management logic 542-2 may be operable to cause the processor 512 to process the power input data 544-1, battery status data 544-2, and/or computing device data 544-3 in accordance with embodiments as described herein. Power input data 544-1, battery status data 544-2, and/or computing device data 544-3 received via the input device 516 and/or the communication device 514 may, for example, be analyzed, sorted, filtered, decoded, decompressed, ranked, scored, plotted, and/or otherwise processed by the processor 512 in accordance with the computing device management logic 542-2. In some embodiments, power input data 544-1, battery status data 544-2, and/or computing device data 544-3 may be fed by the processor 512 through one or more mathematical and/or statistical formulas and/or models in accordance with the computing device management logic 542-2 to identify, classify, and/or otherwise compute whether or not one or more computing devices 510 may be shut down, e.g. to conserve energy, in accordance with embodiments described herein.

According to some embodiments, the crypto-mining instructions 542-3 may be operable to cause the processor 512 to process the power input data 544-1, battery status data 544-2, and/or computing device data 544-3 in accordance with embodiments as described herein. Power input data 544-1, battery status data 544-2, and/or computing device data 544-3 received via the input device 516 and/or the communication device 514 may, for example, be analyzed, sorted, filtered, decoded, decompressed, ranked, scored, plotted, and/or otherwise processed by the processor 512 in accordance with the crypto-mining instructions 542-3. In some embodiments, power input data 544-1, battery status data 544-2, and/or computing device data 544-3 may be fed by the processor 512 through one or more mathematical and/or statistical formulas and/or models in accordance with the crypto-mining instructions 542-3 to generate and/or conduct crypto-mining work on the computing device 510.

According to some embodiments, the PoW instructions 542-4 may be operable to cause the processor 512 to process the power input data 544-1, battery status data 544-2, and/or computing device data 544-3 in accordance with embodiments as described herein. Power input data 544-1, battery status data 544-2, and/or computing device data 544-3 received via the input device 516 and/or the communication device 514 may, for example, be analyzed, sorted, filtered, decoded, decompressed, ranked, scored, plotted, and/or otherwise processed by the processor 512 in accordance with the PoW instructions 542-4. In some embodiments, power input data 544-1, battery status data 544-2, and/or computing device data 544-3 may be fed by the processor 512 through one or more mathematical and/or statistical formulas and/or models in accordance with the PoW instructions 542-4 to generate and/or communicate proof of crypto-mining work generated and/or conducted, in accordance with embodiments described herein.

According to some embodiments, the computing device 510 may comprise the cooling device 550. According to some embodiments, the cooling device 550 may be coupled (physically, thermally, and/or electrically) to the processor 512 and/or to the memory device 540. The cooling device 550 may, for example, comprise a fan, heat sink, heat pipe, radiator, cold plate, and/or other cooling component or device or combinations thereof, configured to remove heat from portions or components of the computing device 510.

Any or all of the exemplary instructions and data types described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the computing device 510. According to some embodiments, the memory device 540 may be incorporated into and/or otherwise coupled to the computing device 510 (e.g., as shown) or may simply be accessible to the computing device 510 (e.g., externally located and/or situated).

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002© published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the disclosure may be practiced with various modifications and alterations, such as structural, logical, software, and electrical modifications. Although particular features of the disclosure may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the disclosure, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present disclosure can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the disclosure as defined by the claims appended hereto.

What is claimed is:

1. A remote, self-powered Proof-of-Work (PoW) system, comprising:
    a generator operably coupled to a waste fluid flow and configured to generate an amount of electrical power;
    a sensor electrically coupled to at least one of the generator and the waste fluid flow and configured to sense a parameter indicative of the amount of electrical power generated by the generator;
    a power storage device electrically coupled to the generator and the sensor and having an amount of stored power;
    a communication device configured to communicate with a remote server, the communication device comprising a minimum power requirement; and
    a computing device electrically coupled to the generator, the power storage device, the sensor, and the communication device, the computing device comprising a minimum power requirement, a maximum power requirement, and a memory device comprising a logic program configured to:
        generate a PoW output;
        compute a minimum system power requirement and a maximum system power requirement to power the computing device and the communication device based on the minimum and maximum power requirements of the communication device and the computing device;
        compute an instantaneous power supplied by the generator based on the parameter indicative of the amount of electrical power supplied sensed by the sensor;
        compare the instantaneous power supplied by the generator with the minimum and maximum system power requirements;
        route an amount of excess power to the power storage device when the instantaneous power supplied by the generator is greater than the maximum system power requirement; and
        pull at least a portion of the amount of stored power from the power storage device to the computing device when the instantaneous power supplied by the generator is less than the minimum system power requirement;
    wherein the computing device and the communication device cooperate to communicate the PoW output with the remote server.

2. The remote, self-powered PoW system of claim 1, wherein the parameter indicative of the amount of electrical power generated by the generator and sensed by the sensor comprises a voltage measured across the generator.

3. The remote, self-powered PoW system of claim 2, wherein the parameter indicative of the amount of electrical power generator by the generator and sensed by the sensor further comprises a current flow from the generator.

4. The remote, self-powered PoW system of claim 1, wherein the computing device is indirectly coupled to the generator through the power storage device.

5. The remote, self-powered PoW system of claim 1, wherein the computing device comprises a plurality of computing devices.

6. The remote, self-powered PoW system of claim 5, wherein the plurality of computing devices includes a plurality of blade servers.

7. The remote, self-powered PoW system of claim 5, wherein a first of the plurality of computing devices is coupled to the generator, and a second of the plurality of computing devices is coupled to the generator through the first of the plurality of computing devices.

8. The remote, self-powered PoW system of claim 5, wherein the minimum power requirement is the power required to run one of the plurality of computing device and the communication device.

9. The remote, self-powered PoW system of claim 5, wherein the minimum power requirement is the power required to run one of the plurality of computing devices.

10. The remote, self-powered PoW system of claim 1, wherein the logic program is further configured to store the PoW output within the memory device.

11. The remote, self-powered PoW system of claim 10, wherein the computing device and the communication device cooperate to communicate stored PoW output to the remote server after an event whereby the communication device is decoupled from the remote server.

12. The remote, self-powered PoW system of claim 1, further comprising an excess waste fluid tank, and wherein the logic program is further configured to route an amount of waste fluid from the waste fluid flow into the excess waste fluid tank when the instantaneous power available is greater than the maximum power requirement associated with the computing device.

13. A method of providing Proof-of-Work (PoW) output to a remote server, comprising:

generating an amount of electrical power by coupling a generator to a waste fluid flow and delivering the amount of electrical power to a computing device;

sensing a parameter indicative of power generated by a sensor coupled to the generator;

communicating the parameter indicative of power generated to the computing device;

storing a logic program on a memory device of the computing device;

computing an instantaneous power available on the computing device and comparing to a minimum power requirement and a maximum power requirement associated with the computing device;

storing an amount of stored power by routing an amount of the power generated by the generator to a battery when the instantaneous power available is greater than the maximum power requirement associated with the computing device;

delivering at least a portion of the amount of stored power to the computing device when the instantaneous power supplied by the generator is less than the minimum power requirement;

generating a PoW output on the computing device; and communicating the PoW output to a remote server.

14. The method of claim 13, wherein the amount of electrical power is delivered to the computing device through the battery.

15. The method of claim 13, further comprising:

routing an amount of waste fluid from the waste fluid flow to a vessel when the instantaneous power available is greater than the maximum power requirement associated with the computing device.

16. The method of claim 15, wherein the computing device is in communication with a valve in the waste fluid flow, and wherein the valve routes the waste fluid flow to at least one of the generator and the vessel.

17. The method of claim 13, further comprising:

storing the PoW output on the memory device.

18. The method of claim 17, wherein the PoW output is stored on the memory device until the PoW output is communicated to the remote server.

* * * * *